United States Patent [19]

Maurino et al.

[11] 4,045,153

[45] Aug. 30, 1977

[54] MOLDING APPARATUS INCLUDING ONE-PIECE FLEXIBLE MOLD AND MEANS TO RESTRICT THE DEFORMATION OF THE MOLD

[75] Inventors: William J. Maurino; Raymond M. Putzer, both of Racine, Wis.

[73] Assignee: Precision Flexmold, Inc., Racine, Wis.

[21] Appl. No.: 724,356

[22] Filed: Sept. 17, 1976

Related U.S. Application Data

[63] Continuation of Ser. No. 542,214, Jan. 20, 1975, abandoned.

[51] Int. Cl.$^2$ .......... B28B 7/06; B29C 7/00

[52] U.S. Cl. .......... 425/440; 425/DIG. 44; 425/DIG. 58; 249/134; 249/139; 264/335

[58] Field of Search .......... 249/139.91, 127, 183, 249/120; 425/DIG. 44, 440

[56] References Cited

U.S. PATENT DOCUMENTS

| | | | |
|---|---|---|---|
| 1,953,167 | 4/1934 | Geyer | 249/120 X |
| 3,353,220 | 11/1967 | Lenoble | 249/127 X |
| 3,776,683 | 12/1973 | Putzer et al. | 425/DIG. 44 X |
| 3,883,109 | 5/1975 | Hahne | 249/127 X |

*Primary Examiner*—Ronald J. Shore
*Assistant Examiner*—John S. Brown
*Attorney, Agent, or Firm*—James E. Nilles

[57] ABSTRACT

Molding apparatus for molding articles without a seam or parting line even though the molded articles may have severe backdraft portions. The apparatus includes a one-piece flexible mold which is deformable subject to the application of fluid pressure, a vacuum pot large enough to accommodate the flexible mold therein and means for applying vacuum to the pot such that the mold may be expanded by the vacuum thereby releasing the molded article. The vacuum pot is provided with upwardly extending projections positioned in the bottom of the pot and the mold is provided with a restraining ring member for supporting the mold wall and for acting in conjunction with the upwardly extending projection to control the mode of expansion of the mold.

8 Claims, 7 Drawing Figures

MOLDING APPARATUS INCLUDING ONE-PIECE FLEXIBLE MOLD AND MEANS TO RESTRICT THE DEFORMATION OF THE MOLD

REFERENCE TO RELATED CO-PENDING APPLICATION

This application is a continuation application of the co-pending U.S. patent application Ser. No. 542,214, filed Jan 20, 1975 and entitled "Molding Apparatus including a One-Piece Flexible Mold and Means to Restrict the Deformation of the Mold."

BACKGROUND OF THE INVENTION

The present invention pertains to molding apparatus which includes a one-piece distensible flexible mold and a vacuum pot means for causing the mold to expand radially outwardly such that a molded article will be released from the mold. Such apparatus allows the molding of seamless articles in a one-piece mold even though the mold has substantial undercut portions.

Mold apparatus of this type are shown in U.S. Pat. No. 3,776,683 issued Dec. 4, 1973 to Putzer et al. It has proved difficult, however, in some applications, to use such apparatus to mold articles having protrusions which extend downwardly into the bottom wall of the mold. Using molding apparatus of this type, when the molding material is poured or packed into the mold cavity a fluid tight seal may be created between the mold walls and the surface of the molded article. Before the article can be removed from the mold, the mold walls including the bottom wall must be completely pulled away from the article by allowing air pressure to push the mold away from the molded article. In those cases where the mold has downwardly extending projections, it is difficult to get air around the downwardly extending projection to break the seal between the mold bottom and the article. A second problem is faced when molding articles which have downwardly extending projections which are not concentric with respect to the center line of the mold. The outward radial expansion of the bottom wall of the mold causes stress to be placed on the projection making removal of the article difficult and perhaps causing damage to the projection or mold.

SUMMARY OF THE INVENTION

The present invention is directed to improvements in the flexible mold and the vacuum pot to require flexure of the mold such that articles having shapes which formerly precluded molding in a one-piece mold can now be molded in such apparatus.

The present invention is an improvement over the prior art because it includes an annular restraining ring imbedded in a part of the mold or attached to the exterior of the lower periphery of the mold to restrict the amount of radial stretching or distortion of that part of the mold material adjacent to the ring. The restriction functions as a means of overcoming the problems of the prior art and the restriction also prevents any accidental undue stretching of the mold and consequent rupture of the mold wall.

The present invention also includes upwardly extending projections from the bottom of the vacuum pot acting in combination with the restraining ring to cause non-uniform distortion of the mold to further facilitate removal of the molded article. During the molding process, the mold is stretched downwardly into the vacuum pot and radially outwardly by the vacuum. The purpose of the upwardly extending projections is to act in concert with the annular restraining ring to facilitate the passage of air under the mold so that the seal between the bottom of the molded article and the mold is broken. The upwardly extending projection retards the downward stretching of that part of the bottom wall of the mold which contacts it, but the flexibility of the mold allows an adjacent part of the mold bottom wall to continue to stretch resulting in distortion of the bottom wall of the mold allowing passage of air thereunder and the consequent pulling away of the mold wall from the molded article.

The combination of the restraining ring attached to the periphery of the mold and the upwardly extending projection provides means for directing the expansion of the mold when it is subjected to the vacuum and causing it to stretch in a manner that allows articles having diverse shapes to be molded.

The use of the restraining ring also protects the mold from stretching to the point of rupturing and thereby prolongs the useful life of the mold.

DESCRIPTION OF THE PREFERRED EMBODIMENT

Generally, the present invention is concerned with the production of articles formed of hardenable material in flexible molds and particularly those articles having considerable backdraft or undercut portions and having downwardly extending projections. Various types of materials may be molded with the present invention and include but are not limited to plaster, cement, resins, paraffin, polyester, epoxies, urethane, foams, metal, or other materials.

The flexible material used to comprise the mold body may consist of any flexible mold material having elastomeric properties, the specific type of mold material used generally depending on the compatability of the mold material with the materials molded. Materials having the desirable elastomeric properties include, for example, but not by way of limitation, polyvinyl chloride "Korogel" produced by B. F. Goodrich of Akron, Ohio; polysulphide cold molding compounds sold by Perma Flex of Columbus, Ohio; the silastic RTV silicone rubber produced by Dow Corning and General Electric; and various urethane elastomers.

Figure 1:
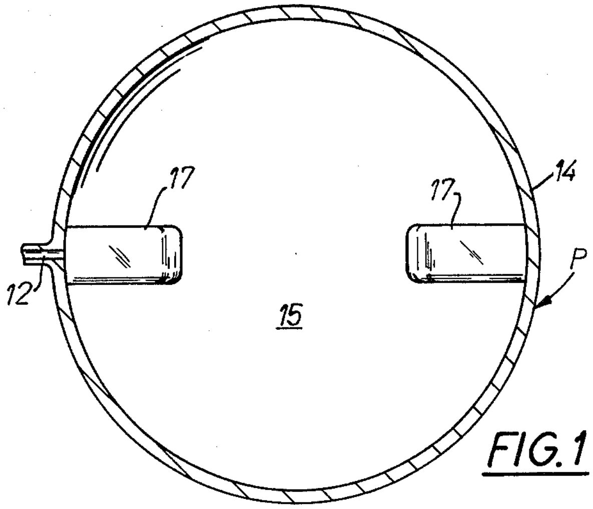
FIG. 1 is a plan view taken on line 1-1 through FIG. 2 and shows the upwardly extending projections positioned in the bottom of the vacuum pot.
Figure 2:
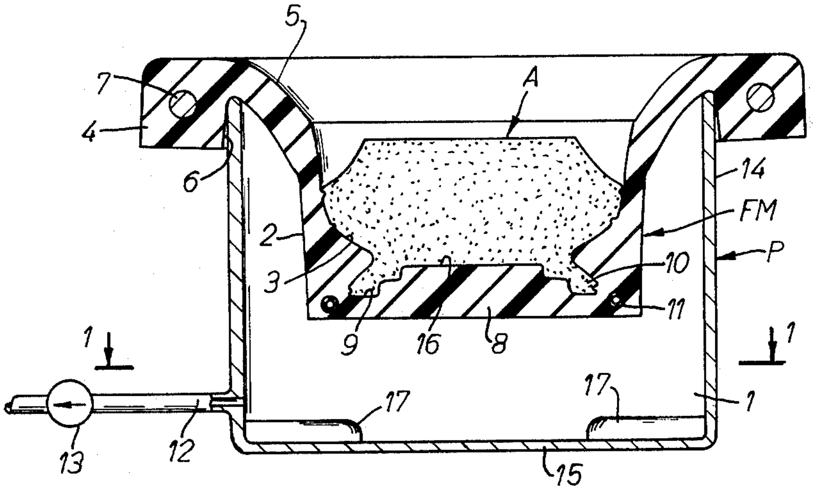
FIG. 2 is an elevation view of the mold in the vacuum pot with vacuum applied causing initial distortion of the mold.

The invention is shown generally in FIG. 2 as including a one-piece distensible flexible mold FM which contains a molded article A. The flexible mold is suspended in a vacuum pot P such that a fluid tight vacuum chamber 1 is maintained between the mold FM and the pot P.

The mold is comprised of a generally cylindrical side wall 2 which is of varying thickness such that it defines a mold cavity 3 having undercut portions. The thickness of the side wall 2 is such that it is self-supporting and can support the weight of the molding material without significant distortion of the mold. Adjacent the upper end of the mold is an integrally formed relatively thick and self-supporting radially extending flange 5 which is capable of freely supporting the mold in the vacuum pot. FIG. 2 shows the mold within the pot in a partially stretched condition after vacuum is applied in the vacuum chamber. Before vacuum is applied, the mold is freely supported on the pot without substantial distortion. The flange is provided at its periphery with a downwardly extending annular projection 4 which has an inside surface 6 which fits freely over the outside surface of the upper portion of the pot. The flange may also include an annular restraining member 7 imbedded in its periphery, the restraining member having the property of not being inwardly radially compressible. The restraining member 7 may be comprised of a plastic or metal tube, a solid metal ring or a tightly coiled spring imbedded in the periphery of the flange.

The mold also has a bottom wall 8 having a downwardly extending undercut chamber 9 having an annular configuration which defines a lower annular flange 10 on the molded article A. Imbedded in the material comprising the periphery of the bottom wall and the lower portion of the side wall is an annular restraining ring 11. The restraining ring is made of a material which is less elastic than the mold material and has the intended purpose of preventing outward radial stretching or expansion of that part of the mold adjacent the ring. The ring generally comprises a material which is flexible but not axially stretchable, for example, but not by way of limitation, a plastic coated steel cable or a hollow flexible tube.

The vacuum pot shown in FIG. 2 generally consists of side wall 14 and bottom wall 15 The vacuum pot is of sufficient diameter and depths as to receive the mold therein and to allow the mold to expand sufficiently that the molded article may be removed. Attached to the pot is a conduit 12 and a vacuum pump 13 providing means for drawing a vacuum in the chamber formed between the mold and the pot. The vacuum pot also includes projections 17 located in the bottom of the pot abutting the side walls.

Figure 3:
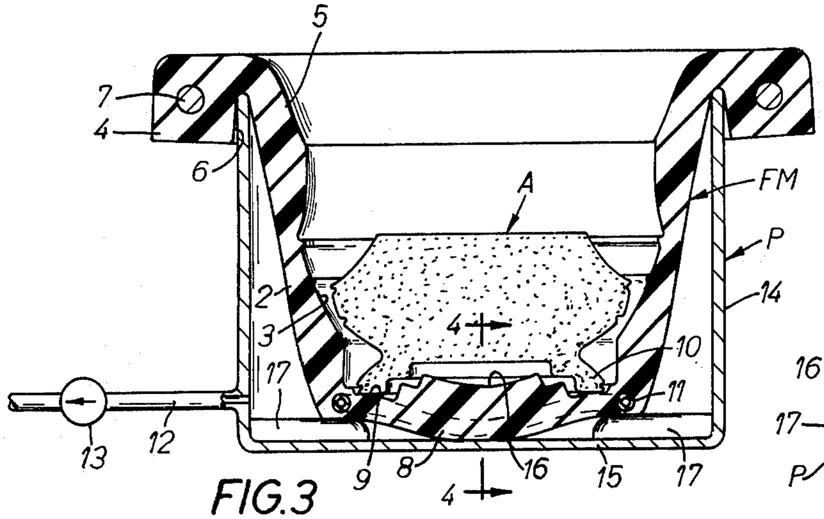
FIG. 3 is an elevation view similar to that shown in FIG. 2 but with vacuum applied such that the mold has been distended downwardly into the pot and expanded radially outwardly sufficiently to allow the molded article to be removed.

In the operation of the molding apparatus, generally, when vacuum is applied through the conduit, the flexible mold is pulled downwardly into the vacuum pot and the side walls are caused to expand radially as shown in FIG. 3. The vacuum drawn in the vacuum chamber 1 creates a pressure differential such that atmospheric pressure initially forces the mold downwardly and then air pressure is admitted into gaps forming between the mold side wall and the molded article and this air pressure then forces the mold walls outwardly away from the article. Once the mold has been stretched away from the molded article, it can be easily removed from the mold. Difficulties may arise, however, in forcing the bottom wall 8 of the mold away from the bottom wall of the molded article. It has been found to be particularly difficult to remove articles which have projections which extend downwardly into the bottom wall of the mold as shown, for example, by the downwardly extending annular ring 10 of molded article A, shown in FIGS. 2 and 3. During the molding process, when mold material is poured or packed into the mold cavity, a seal is created between the bottom wall of the mold and the mold article. As a result, before the article can be freely removed from the mold, the mold must be flexed such that air is allowed to seep between the molded article and the mold bottom. In those cases where the molded article has a downwardly projecting annular projection 10, it is particularly difficult to flex the mold sufficiently to get air around the porjection and between the molded article and the mold surface. This is particularly true because the outward radial expansion of the mold bottom during the expansion of the mold causes a sealing engagement between the central upwardly projecting part 16 of the mold bottom and the inside surface of the annular projection.

Figure 4:
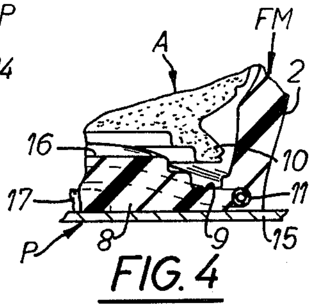
FIG. 4 is a partial elevation taken along the line 4—4 in FIG. 3 and showing distortion of the bottom and side walls of the mold which allows the molded article to be released from the mold.

The purpose of the projection 17 placed in the bottom of the pot is to cause distortion of the bottom wall of the flexible mold sufficiently to allow the passage of air under the downwardly extending flange and between the mold wall surface and the bottom of the molded article as shown in FIGS. 3 and 4. As shown in FIGS. 2–4, when vacuum is applied to the vacuum chamber, the mold distorts downwardly into the pot. The projections however, arrest the downward movement of portions of the periphery of the bottom wall of the mold and cause some distortion of the bottom wall. This distortion creates gaps between the annular flange of the molded article and the mold and allows air to flow under the molded article thereby allowing the bottom wall of the mold to be pulled downwardly away from the molded article facilitating removal of the article from the mold.

The annular restraining ring member 11 shown in FIGS. 2–4 operates in conjunction with the upwardly extending projections to further facilitate removal of the article. The ring member is generally comprised of a material which is flexible but which prevents outward radial expansion of the diameter of that part of the mold in which it is imbedded. Thus, during the expansion of the mold caused by the vacuum, the ring member shown in FIGS. 2 through 4 prevents expansion of the diameter of the bottom wall of the mold. This in turn prevents outward expansion of the central, upwardly projecting part 16 of the bottom wall thereby avoiding outward pressure on the flange by the mold material and the consequent sealing engagement against the inside of the downwardly extending flange. The ring member also has the additional function of preventing undue stretching of the mold which may cause rupture of the mold material.

FIGS. 3 and 4 generally show the configuration assumed by the bottom wall of the mold in its fully distended position. The projections cause a bowing of the central portion of the mold bottom wall and cause the mold material to slightly flex away from the flange at the two points on the circumference of the flange at 90° intervals from the projections and allows air pressure to get between the flange and the mold and then between the mold surface and the bottom of the molded article as shown in FIG. 4. Though the annular restraining ring imbedded in the periphery of the bottom of the mold is distorted downwardly somewhat as shown in FIG. 3, the distortion is not so great as to cause any noticeable radial inward contraction of the ring member.

Figure 5:
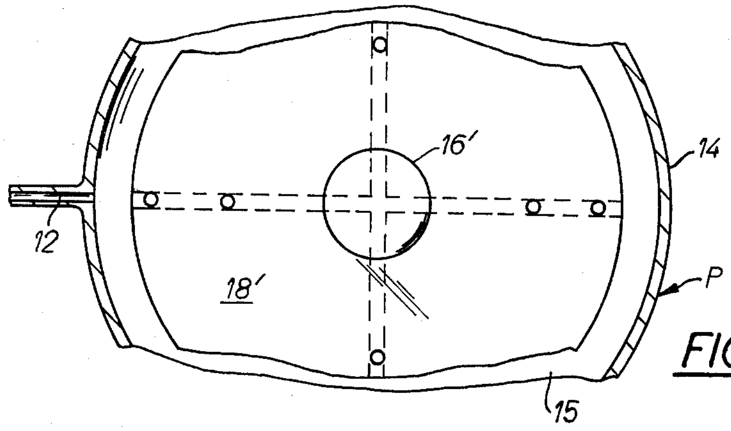
FIG. 5 is a partial plan view taken through the line 5—5 of FIG. 6 and is similar to FIG. 1, but showing a second embodiment.
Figure 6:
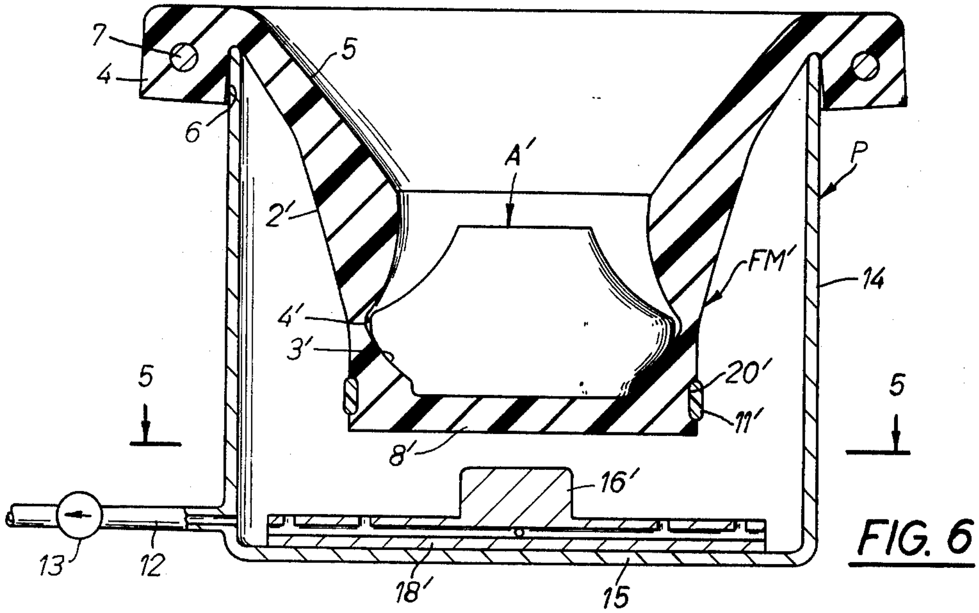
FIG. 6 is an elevation view similar to that of FIG. 2, but showing a second embodiment of the mold in a partially stretched condition.
Figure 7:
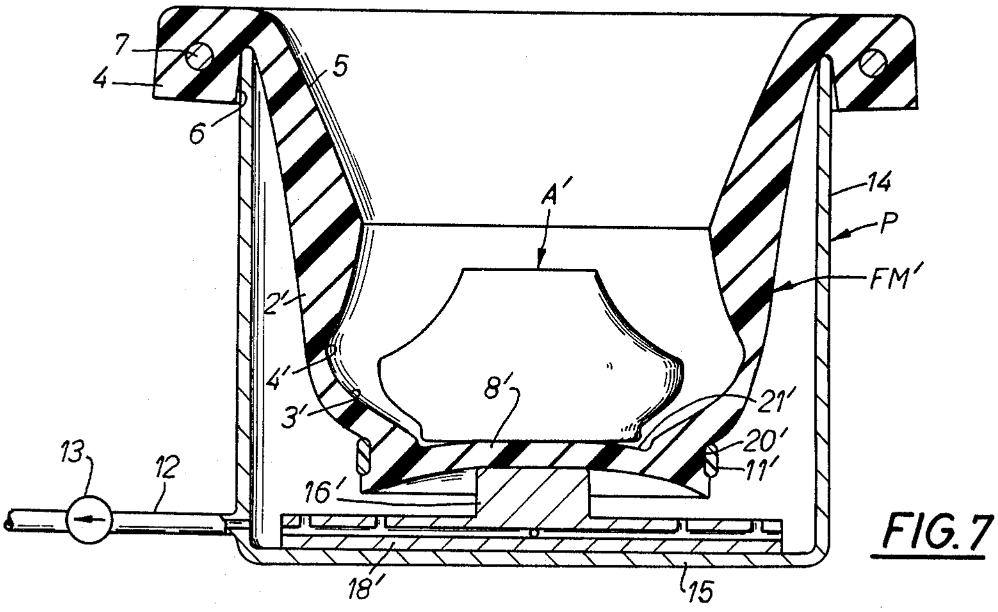
FIG. 7 is a view similar to FIG. 6 but showing the mold in the fully stretched condition such that the article may be removed.

FIGS. 5 through 7 show an embodiment of the invention similar to that shown in FIGS. 1–4, the common elements being consistently numbered. The mol FM′ has a cavity 3′ which has a substantial undercut portion 4′ such that an article A′ can be molded having an upper neck portion substantially narrower in diameter than the body portion. The manifold 18′ is shown as having a single upwardly extending projection 16′ located in its center, and the mold FM′ has an external restraining ring 11′ secured in a groove 20′ around the periphery of the bottom wall 2′ of the mold.

One purpose of the external restraining ring 11′ used in conjunction with the upwardly extending projection 16′ is to cause a controlled distortion of the mold when vacuum is applied in the pot such that the seal between the surface of the bottom wall 8′ of the mold and the bottom of the article is broken so that the article A may be easily removed from the mold. As shown in FIG. 7, when vacuum is applied, the projection 16′ arrests the downward movement of the center portion of the bottom wall 8′ of the mold. The outer circumferential portions of the bottom wall of the mold bounded by the restraining ring 11′, are stretched downwardly such that a gap 21′ is created around the periphery of the bottom wall of the mold. The restraining ring facilitates the formation of the gap 21′ by causing a generally downward bending of the periphery of the bottom wall rather than an outward radial stretching. The external restraining ring 11′ also acts in the same manner as the restraining ring 11 shown in FIGS. 2 through 4 to prevent such severe stretching of the mold as to result in tearing or rupture of the mold wall.

RESUME

The apparatus provided by this invention provides means for controlling the distortion of a flexible mold such that various portions of the side walls or bottom wall of the mold are distorted substantially and other portions of the side wall or bottom wall are restrained. These means facilitate the withdrawing of projections of the bottom wall of the mold extending into substantial undercuts in the molded article and thereby facilitate release of the molded article from the mold. The apparatus provided by this invention also provides means to restrict the extent of expansion of the mold thereby preventing tearing or rupture of the mold and preserving the useful life of the mold.

We claim:

1. Apparatus for molding seamless articles comprising, a generally hollow one-piece distensible mold of elastomeric material having a vertically extending side wall and a bottom wall, a vacuum pot having a bottom wall and a side wall and being of such size so as to receive said mold therein, said mold and pot forming an annular chamber therebetween, means connected to and for drawing a vacuum on said chamber whereby said mold distends downwardly and expands radially into said chamber to release the molded article from the mold, said vacuum pot having upwardly extending projection means from its said bottom wall, and said mold including means for supporting the mold side wall and the mold bottom wall, said supporting means including a restraining ring member positioned around said mold side wall to restrict radial expansion of the bottom portion of said mold to prevent rupture thereof and for cooperation with said projection means to cause distortion of the bottom wall as the latter is distended downwardly to thereby free a molded article as said mold distends and expands into said pot so that the molded article may be easily removed from the mold.

2. The apparatus set forth in claim 1 further characterized by said restraining ring member being embedded in the periphery of the bottom wall.

3. The apparatus set forth in claim 1 further characterized by said restraining ring member being fixed to and surrounding the periphery of the bottom wall.

4. A one-piece generally hollow and distensible mold of elastomeric material in combination with a vacuum pot for molding seamless articles whereby said mold distends downwardly and expands radially in said vacuum pot to release the molded article from the mold, said mold having a vertically extending side wall having undercut portions and a bottom wall, said walls being of such thickness as to be self-supporting and capable of supporting the weight of the material poured therein without distortion of the mold, and said mold including means for controlling the radial expansion of the lowermost end of the mold and for preventing rupture of said mold when said mold distends downwardly and expands radially in said vacuum pot, said controlling means including an annular restraining ring member positioned around the lowermost portion of the side wall of said mold and directly radially outwardly from said bottom wall and generally in the same plane, said mold having a self-supporting, radially extending annular flange, said flange having a downwardly extending projection around its periphery, and said flange including an annular member embedded in its periphery.

5. The one-piece mold set forth in claim 4 further characterized in that said annular restraining ring member is embedded in said mold, said ring member being flexible but incapable of expansion in a circumferential direction.

6. The one-piece mold set forth in claim 4 further characterized in that said annular restraining ring member comprises a band fixed to the periphery of said mold adjacent the bottom thereof.

7. The mold set forth in claim 6 further characterized in that said mold has a groove in which said annular band is seated.

8. The mold set forth in claim 6 further characterized in that said ring member is flexible but inextensible so as to prevent an increase in its circumferential direction when said mold is subjected to vacuum.

* * * * *